US008773501B2

(12) United States Patent
Unger

(10) Patent No.: US 8,773,501 B2
(45) Date of Patent: Jul. 8, 2014

(54) MOTORIZED CAMERA WITH AUTOMATED PANORAMIC IMAGE CAPTURE SEQUENCES

(75) Inventor: Howard Unger, Henderson, NV (US)

(73) Assignee: Duco Technologies, Inc., Henderson, NV (US)

( * ) Notice: Subject to any disclaimer, the term of this patent is extended or adjusted under 35 U.S.C. 154(b) by 550 days.

(21) Appl. No.: 13/164,358

(22) Filed: Jun. 20, 2011

(65) Prior Publication Data
US 2012/0320148 A1 Dec. 20, 2012

(51) Int. Cl.
*H04N 7/00* (2011.01)
*H04N 7/18* (2006.01)
*H04N 5/232* (2006.01)

(52) U.S. Cl.
CPC ................................ *H04N 5/23238* (2013.01)
USPC ............................................. 348/36; 348/143

(58) Field of Classification Search
None
See application file for complete search history.

(56) References Cited

U.S. PATENT DOCUMENTS

| 5,834,765 | A | 11/1998 | Ashdown |
| 6,323,488 | B1 | 11/2001 | McCavit et al. |
| 6,727,938 | B1 | 4/2004 | Randall |
| 7,471,334 | B1 | 12/2008 | Stenger |
| 2002/0159770 | A1 | 10/2002 | Moultrie, Jr. |
| 2003/0122514 | A1 | 7/2003 | Mercier |
| 2004/0017470 | A1* | 1/2004 | Hama et al. ............... 348/42 |
| 2004/0204054 | A1 | 10/2004 | Lee |
| 2006/0216011 | A1 | 9/2006 | Godehn |
| 2008/0151055 | A1 | 6/2008 | Elsemore |
| 2009/0237509 | A1 | 9/2009 | Saxon |
| 2010/0208068 | A1 | 8/2010 | Elsemore |
| 2011/0150450 | A1 | 6/2011 | Schnell |

FOREIGN PATENT DOCUMENTS

WO  WO/2010/137860  2/2010

* cited by examiner

*Primary Examiner* — Joseph Ustaris
*Assistant Examiner* — Zhubing Ren
(74) *Attorney, Agent, or Firm* — Lightbulb IP, LLC

(57) ABSTRACT

A motorized camera provides one or more capture sequences for capturing images of objects detected within one or more of its detection zones. The capture sequences may include actions to move or reposition the camera to one or more locations, and to capture one or more images before, during, or as the camera is moved. In addition, particular operations of the motorized camera may be conditioned on specific circumstances or environmental conditions relevant to image capture or the operation of the motorized camera. The motorized camera may comprise a moving camera for capturing images, one or more sensors that provide the to detection zones, and one or more illuminators held by an enclosure. A battery or other power source may be provided as well to allow the motorized camera to be portable and operate independent of external power sources or other external devices.

17 Claims, 7 Drawing Sheets

MOTORIZED CAMERA WITH AUTOMATED PANORAMIC IMAGE CAPTURE SEQUENCES

BACKGROUND OF THE INVENTION

1. Field of the Invention

The invention relates to automated image capture systems and in particular to a motorized event capture camera with panoramic capture sequences.

2. Related Art

Photographs and other captured images are widely used to record events, objects, animals, and people. As such, captured images are highly desirable for personal use and for commercial use, especially if the captured image is a high quality image.

Capturing a desired image can be difficult. Environmental conditions such as the amount and color of available light can have negative effects on a photograph or other captured image. In addition, depending on the situation, there may be few vantage points which can be easily, safely, or conveniently used to capture an image. Sometimes, the ideal vantage point may be hazardous or simply inconvenient. For example, few photographers may wish to spend a night in the mountains or a day in the desert to capture an image. Moreover, the object to be captured may move unpredictably. Therefore to capture a desired image of such an object a great deal of time and patience is often required.

From the discussion that follows, it will become apparent that the present invention addresses the deficiencies associated with the prior art while providing numerous additional advantages and benefits not contemplated or possible with prior art constructions.

SUMMARY OF THE INVENTION

A motorized camera capable of executing one or more capture sequences where one or more images are captured is disclosed herein. The motorized camera may have a rotatable or movable camera which may automatically position itself to target a particular area according to a capture sequence. The motorized camera may detect the presence of an object of interest to initiate a capture sequence. A capture sequence may provide instructions regarding where to capture images in response to the presence of an object, and to automate activation/deactivation or other functions of various components of the motorized camera, such as illuminators. The motorized camera may be a portable design, which combined with the capture sequences, allow for unattended operation for long periods of time. This is highly advantageous in capturing images of objects of interest.

The motorized camera may have various configurations. For example, in one embodiment, a motorized camera may comprise a plurality of sensors arranged to provide a plurality of detection zones, a camera configured to capture one or more images at the plurality of detection zones, and a rotating mount supporting the camera. The rotating mount may have a plurality of positions corresponding to the plurality of detection zones. In this manner, the camera can target and capture an image of the contents of each of the detection zones. A motor may be provided to move the rotating mount and camera, and a storage device may be provided to store captured images.

One or more processors may be included as well. The processors may be configured to receive input from at least one of the plurality of sensors. The input will typically identify at least one of the plurality of detection zones where an object has been detected, and to execute one or more capture sequences thereafter. Capture sequences may comprise instructions for activating the motor to move the camera to at least one of the plurality of positions that corresponds to the detection zone where the object was detected, capturing one or more images at this position, and storing the images on the storage device.

The motorized camera may include an internal power source and an enclosure as well. The enclosure may form an outer shell of the motorized camera while the power source may be used to provide electrical power for the motorized camera. In this manner, the motorized camera may be made portable such that it is easily to deployable and not dependent on external devices or power to function.

A plurality of illuminators may also be included to illuminate or light an area for image capture purposes. The illuminators may be positioned to illuminate at least one of the plurality of detection zones. In addition or alternatively, individual illuminators may be provided to illuminate each of the detection zones. It is noted that the processor may be configured to activate at least one of the plurality of illuminators corresponding to the detection zone where the object was detected. In this way, the camera may capture an image illuminated by an illuminator.

The capture sequences may also include activating the motor a second time to move the camera to at least one of the plurality of positions that corresponds to a different one of the detection zones than the detection zone where the object was detected. One or more additional images may then be captured at the different one of the plurality of positions, and the additional images may then be stored on the storage device.

In addition or alternatively, the images may be tagged (without tagging the additional images) as part of a capture sequence. In this manner, these images may be easily identified from the additional images, helping a user sort the images. This is beneficial in that the tagged images may be those of a detection zone where an object was detected. Therefore it is more likely that an image of the object will be found in the tagged images.

In another exemplary embodiment, a motorized camera may comprise a plurality of sensors configured generate sensor information identifying at least one of a plurality of detection zones in which an object has been detected, and a camera movable between a plurality of positions. Each of the plurality of positions may be associated with one of the plurality of detection zones. A motor may be configured to move the camera between each of the plurality of positions.

One or more capture sequences comprising instructions to move the camera to a first position of the plurality of positions with the motor, and to capture one or more images with the camera at the first position may be provided as well. It is noted that the first position may be a position that is associated with one of the plurality of detection zones where the object has been detected. The capture sequences may further comprise instructions to move the camera to one or more second positions with the motor, and to capture one or more images with the camera at each of the second positions. In this manner a wide view can be captured by capturing one or more images, moving the camera, and capturing one or more additional images.

One or more processors may be configured to receive the sensor information and execute at least one of the capture sequences based on the sensor information. For example, a first capture sequence may be executed for certain sensor information while a second capture sequence may be executed for different sensor information (e.g., sensor information indicating detection of an object in a different detection zone).

The processors may also be configured to stitch together at least one of the images captured at the first position and at least one of the images captured at each of the second positions to form a panoramic image. In addition or alternatively the processors may be configured to distinguish the images captured at the first position from the images captured at the second positions by either storing the images captured at the first position but not the images captured at the second positions in a particular directory, or tagging the images captured at the first position but not the images captured at the second positions with an identifier.

Capture sequences may have other instructions as well. For example, the capture sequences may further comprise instructions to move the camera to a second position (and to capture one or more images with the camera at the second position). In this instance, the second position may be one of the plurality of positions that is adjacent to the first position. In addition, it is noted that if the motorized camera has one or more illuminators, the capture sequences may comprise instructions to activate at least one of the illuminators based on criteria such as an ambient light level or the current time of day.

Various image capture methods are provided herein as well. For example, a method of capturing one or more images with a motorized camera may comprise positioning a motorized camera comprising a plurality of sensors and a rotatable camera (configured to capture one or more images if an object is detected in one or more of the plurality of detection zones) at a vantage point. The motorized camera may be positioned such that one or more detection zones provided by the plurality of sensors cover an area of interest. It is noted that the motorized camera may be attached to a structure at the vantage point to secure the motorized camera in position.

As part of the method, one or more capture sequences of the motorized camera may be activated through one or more input devices. These capture sequences may include instructions to move the camera to a first position and to capture one or more images at the first position, such as describe above. After capture, the images may be retrieved from a storage device of the motorized camera for viewing. One or more sensors may also be activated as part of the method to detect the presence of the object in one or more of the detection zones.

It is noted that one or more additional capture sequences may be defined with the input devices of the motorized camera. The additional capture sequences may include instructions to move the camera to one or more second positions and to capture one or more images at the second positions. Also, one or more conditional actions may be defined with the input devices. For example, a conditional action may comprise instructions to activate an illuminator of the motorized camera if the light level does not meet a predefined ambient light threshold or if an image is being captured after a predefined time of day. It is noted that the conditional actions may be part of a capture sequence.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the motorized camera disclosed herein provides one or more detection zones in which objects may be detected, and then initiates one or more automated capture sequences to capture one or more images of the object. As will be to described further below, the capture sequences capture a set or series of one or more images (i.e., photographs) at one or more camera positions to help ensure that an image of the subject is captured. This is so even if the subject is an animal, person, or object capable of moving or is actually moving.

The motorized camera is also advantageous in that it is, in various embodiments, self powered and thus can be easily positioned at various locations. In addition, the motorized camera is capable of monitoring one or more areas for some time. This allows the motorized camera to detect and capture a number of objects or to "wait" for an object for some time. The motorized camera may be ruggedized to withstand various environments including harsh environments. In this manner, the motorized camera can be installed at virtually any location to capture images of various subjects over time.

As will become apparent from the disclosure herein, the motorized camera is well suited for capturing images for a variety of surveillance purposes. For example, the motorized camera may be used for security, such as by positioning or installing the motorized camera to target exit and/or entry points to a building or other structure. In addition, the motorized camera could be used indoors to protect valuable or other items from theft or tampering, such as by positioning or installing the motorized camera at a vantage point where it may detect people, animals, or objects which enter one or more of its detection zones. The motorized camera may also be used to capture wildlife images. For example, the motorized camera may be installed in a forest or other setting to capture wildlife that enters one or more of its detection zones.

Figure 1A:
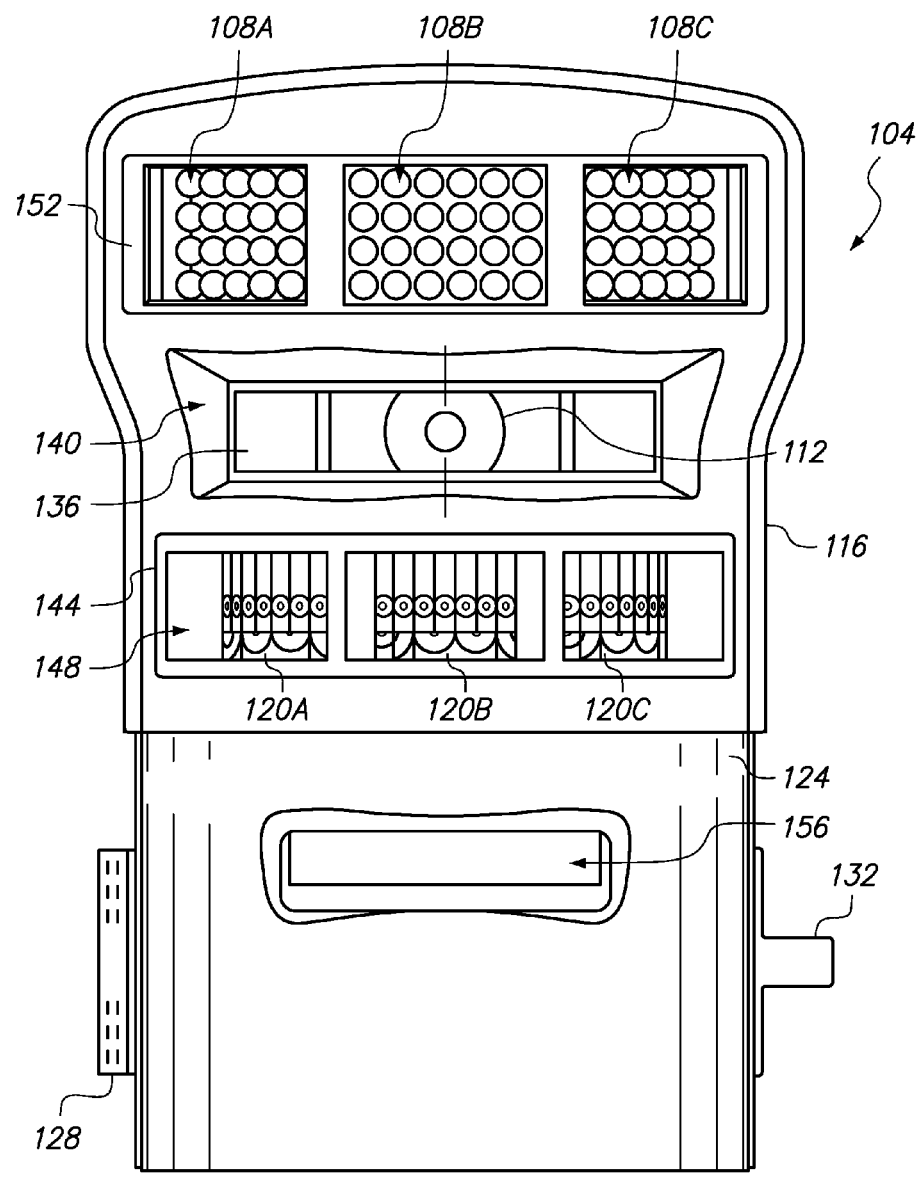
FIG. 1A is a front view of an exemplary motorized camera.
Figure 1B:
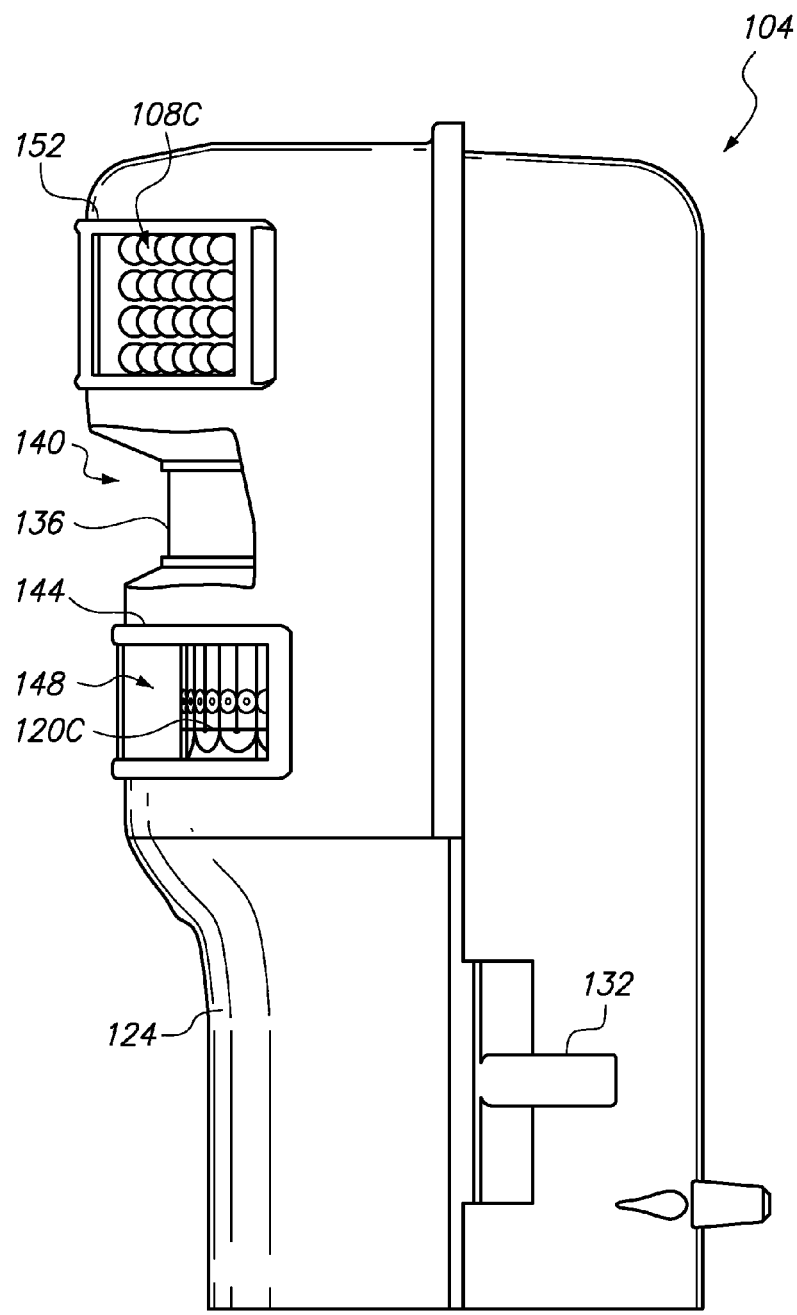
FIG. 1B is a side view of an exemplary motorized camera.

The motorized camera will now be described with regard to FIGS. 1A-1C, which illustrate various views of the motorized camera. FIG. 1A provides a front view, while FIGS. 1B and 1C respectively provide side and top perspective views of the motorized camera 104. As can be seen, the motorized camera 104 may comprise an enclosure 116 which supports or contains the components of the motorized camera. The enclosure 116 may also be a structure which protects such components from the environment (e.g., humidity, moisture, extreme temperatures, physical impacts, dirt, debris, etc. . . . ).

For example, as can be seen, the enclosure 116 may form an outer shell of the motorized camera 104 which supports and protects various components of the motorized camera. In one or more embodiments, the enclosure 116 may be a rigid structure for such purposes. In addition, it is contemplated that the enclosure 116 may be waterproof or water resistant. In some embodiments, the enclosure 116 may have one or more locks or securing mechanisms which prevent unauthorized access or tampering via access panels or doors of the enclosure.

It is contemplated that the enclosure 116 may have features which camouflage or hide the motorized camera 104, so that it is not readily visible. In some embodiments for example, the enclosure 116 may have a camouflage coating. In addition, the enclosure 116 may hide or conceal one or more conspicuous components of the motorized camera. This is advantageous, especially where a subject to be captured may behave differently or avoid the motorized camera 104. For example, wildlife may be spooked by a conspicuous looking device or surveillance may be difficult to gather if suspicious characters are aware of the motorized camera 104.

As stated, the enclosure 116 may support or house various components of the motorized camera 104. Referring to FIG. 1A for instance, it can be seen that the motorized camera 104 may have one or more illuminators 108, a camera 112, and one or more sensors 120 supported by its enclosure 116. The enclosure 116 may have elements which protect these components. For example, a cover 152 may be provided to protect the illuminators 108. The cover 152 may comprise one or more transparent or translucent panels or the like which protect the illuminators 108. The panels may be mounted to the enclosure 116 or a frame thereof.

Similarly the one or more sensors 120 may be protected by their own cover 144. Such cover 144 may also comprise one or more transparent or translucent panels or the like. This permits sensor operation while protecting the sensors 120. It is contemplated that the cover 144 may be transparent to various signals. For example, the cover 144 may be transparent to radio frequencies, visible light, infrared light or other wavelengths of light. This allows a variety of sensors 120 to be used in the motorized camera 104.

The camera 112 may be protected by a cover 136 of its own. Typically, this cover 136 will be transparent so as to allow the camera 112 to capture images through the cover 136 without degrading the image quality. The cover 136 may be curved in one or more embodiments so that the cover does not introduce distortions as the camera 112 is positioned at various angles behind the cover.

Another protective aspect of the enclosure 116 involves its shape. For example, one or more areas of the enclosure may be inset to protect various components. To illustrate, the camera 112 may be mounted in an inset section 140 or portion of the enclosure 116. Likewise, the illuminators 108 and sensors 120 may to also be mounted in one or more inset sections of the enclosure 116.

As stated above, the enclosure 116 may have one or more doors 124 or access panels that may be moved to provide access to an interior portion of the enclosure 116. It is contemplated that one or more hinges 128 or the like may be used to allow doors 124, access panels, or the like to be removable or movable. In one or more embodiments, one or more latches 132, locks, clasps or the like may be provided to secure the doors 124 or access panels in place once closed. These may be secured, such as by a locking mechanism, to prevent tampering.

The enclosure 116 also provides a framework or structure upon which various components of the motorized camera 104 may be positioned at particular locations and orientations. Referring to FIG. 1C for example, it can be seen that the individual sensors 120A,120B,120C have been positioned in a convex configuration. As will be described further below, this allows the combined detection zones of the sensors 120A, 120B,120C to span a wide swath of area. In addition, the detection zones may be continuous between the sensors 120A,120B,120C so as to prevent objects from avoiding detection.

Figure 1C:
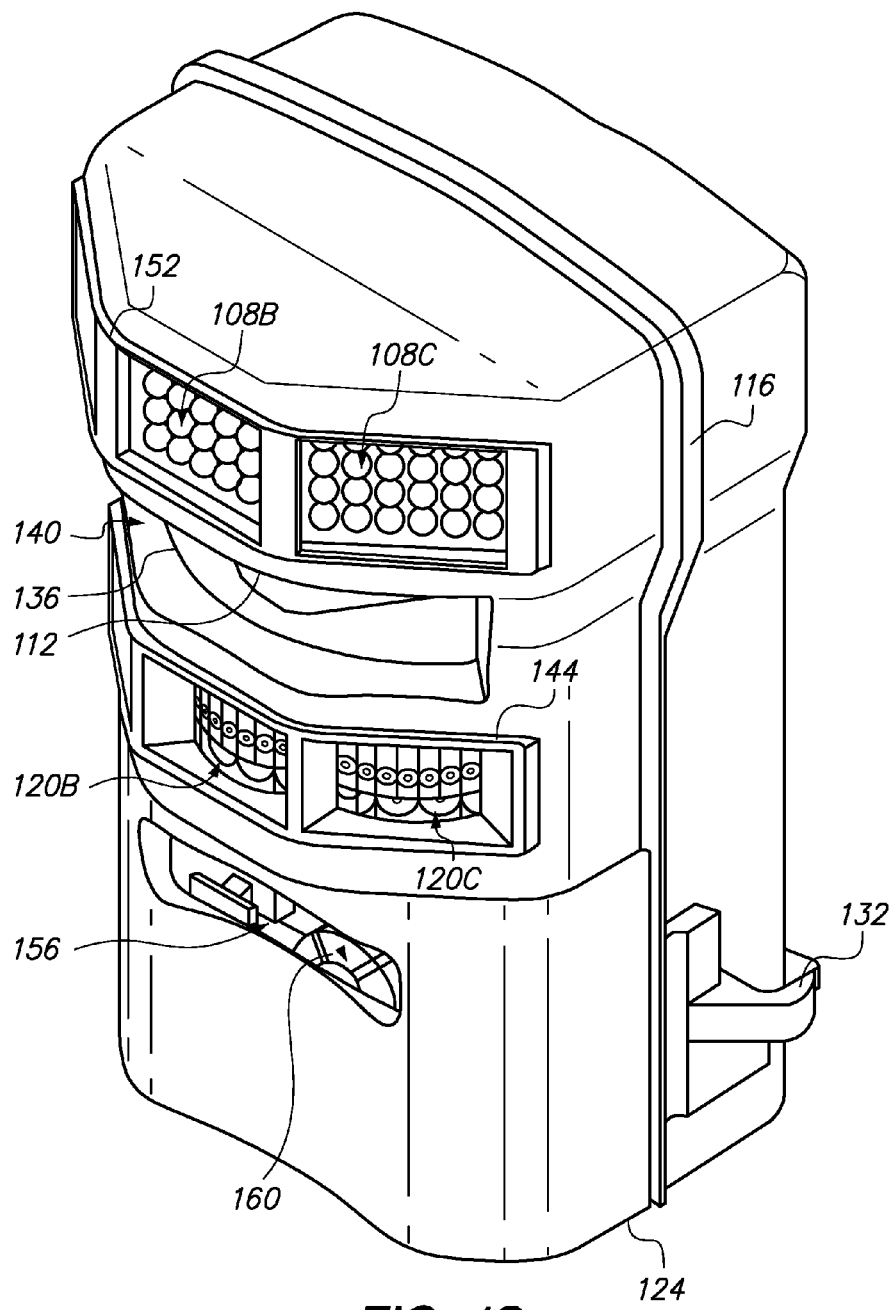
FIG. 1C is a perspective view of an exemplary motorized camera.

FIG. 1C also shows that the illuminators 108A,108B,108C may be of the same or similar number as the sensors 120A, 120B,120C and may have a similar or the same positioning/orientation. To illustrate, it can be seen in FIG. 1C that the illuminators 108A,108B,108C may be in a similar convex arrangement as the sensors 120A,120B,120C. This is beneficial in that an illuminator 108 may be used to provide illumination for the detection zone provided by its corresponding sensor 120. For example, an object detected in a detection zone provided by sensor 120C as well as the detection zone itself may be illuminated by illuminator 108C, which shares a similar or the same outward facing direction.

Likewise, the camera 112 of the motorized camera 104 may be supported by the enclosure 116 such that it may move between positions to target each detection zone provided by the motorized camera's sensors 120. For example, referring to FIG. 1A, the camera 112 may move to a left position to target a detection zone provided by sensor 120A, move to a center position to target the detection zone of sensor 120B, and move to a right position to target the detection zone of sensor 120C.

The camera 112 may move along a continuum between its leftmost and rightmost extents. In one or more embodiments however, predefined camera positions may be provided. Typically such positions will correspond to the arrangement of the sensors 120. For example, a predefined camera position may be one where the camera 112 is at the same angle as one of the sensors 120. In this manner, the camera 112 can capture a complete view of the sensor's detection zone. This increases the likelihood that an object detected in such detection zone will be captured by the camera 112.

Figure 2A:
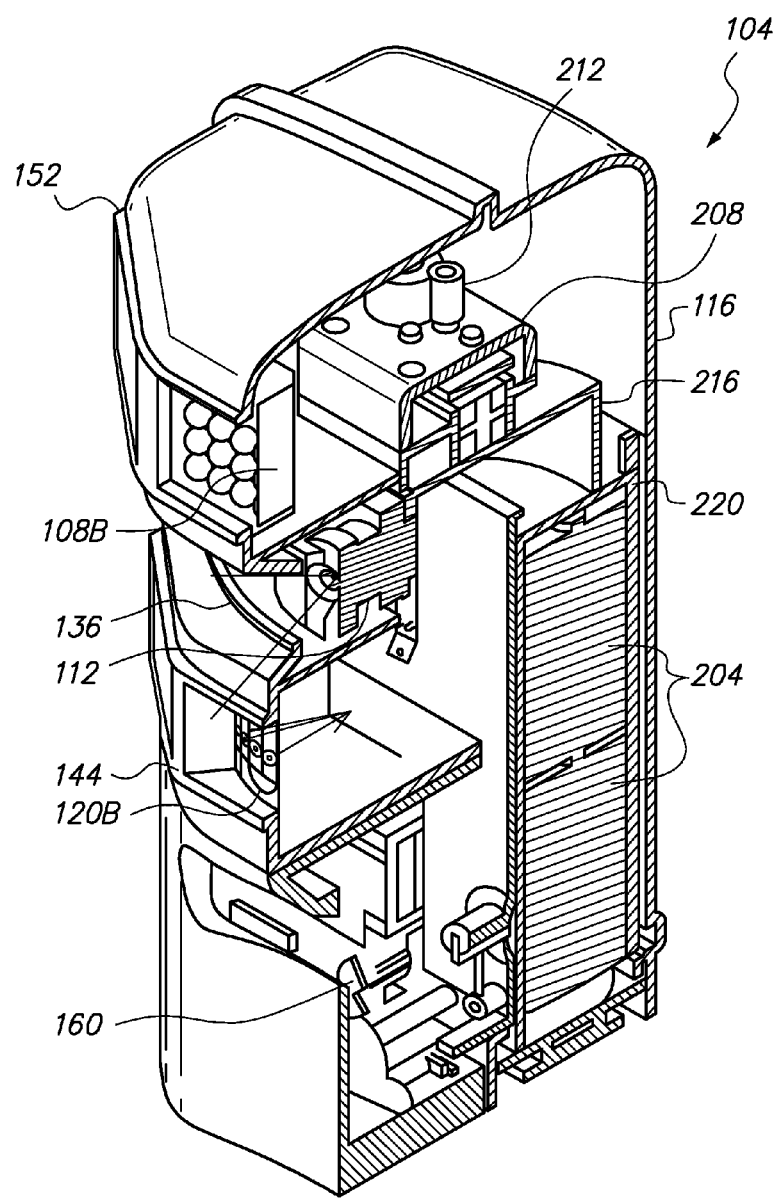
FIG. 2A is a cross section view of an exemplary motorized camera.
Figure 2B:
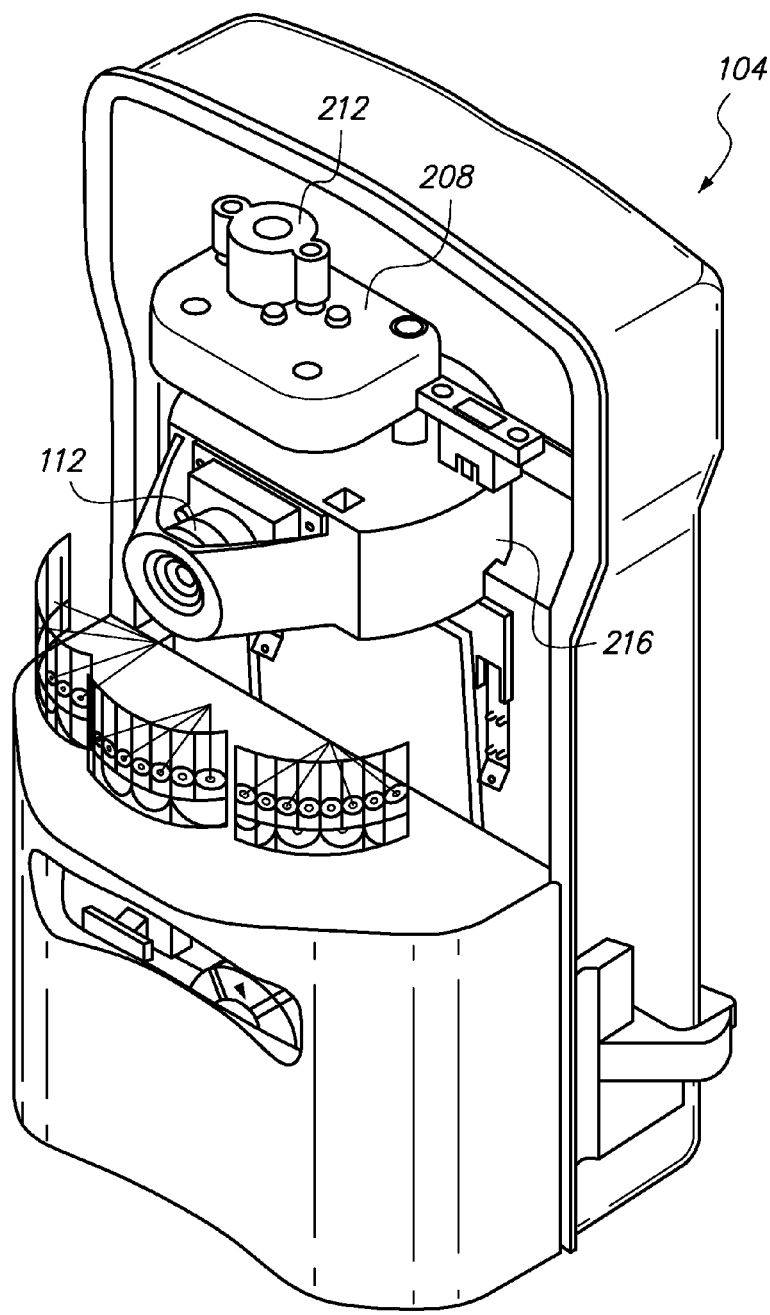
FIG. 2B is an internal view of an exemplary motorized camera.

FIGS. 2A-2B illustrate the interior composition of the motorized camera 104. As can be seen, the enclosure 116 may have one or more interior supports and compartments for housing and/or supporting the various components of the motorized camera 104. For instance, the enclosure 116 may have a battery compartment 220 for housing one or more batteries 204 such that they properly engage one or more leads or terminals of the motorized camera 104 to provide electrical power thereto. It is noted that other power sources may be used with the motorized camera 104. For example, one or more solar panels may be attached to an exterior portion of the enclosure 116.

A portable power source, such as batteries 204, is advantageous in that it permits the motorized camera 104 to be easily deployed at virtually any location. One reason for this is that the motorized camera 104 can utilize its own power source and thus do away with external connections. This allows the motorized camera to be encapsulated within its enclosure 116 and thus allows the camera to be deployed simply by positioning it in a desired location and turning it on.

For example, the motorized camera could be deployed simply by placing it on a table, shelf, or other surface while ensuring its camera faces an area of interest (e.g., an area containing valuable items, where suspicious activity may occur, where an object (e.g., person or wildlife) may appear. The motorized camera may then utilize its battery power to wait for an object to be present, detect the object, and capture one or more images of the object. As can be seen (and as will be detailed further below), the motorized camera can be left unattended to capture images for a user.

The enclosure 116 may have a control compartment 232 as well. The control compartment 232 may contain various electronic devices, such as one or more controllers or microprocessors that govern the operation of the motorized camera 104. In addition or alternatively, one or more input buttons 160 or other input devices could be at or in the control compartment 232. One or more output devices, such as display screens, speakers, or the like could also be mounted to or within the control compartment 232.

A sensor compartment 224 may be provided to house one or more sensors 120. Likewise, an optics compartment 228 may be provided to house one or more illuminators 108, the camera 112 or both.

It is noted that an enclosure 116 may have a variety of compartments other than those described above. In addition, various combinations of components may be installed in or at a particular compartment. Moreover, it is noted that a compartment need not fully enclose its associated components. For example, a compartment or section of the enclosure 116 may be defined by a support plate or other support/mount to which one or more components may be mounted.

As its name suggests, the motorized camera 104 may have support various rotating or moving parts. For instance, the camera 112 may be mounted to a carrier mount 216. Typically, the carrier mount 216 will move, such as by rotating, to position the camera 112 at a desired position. Referring to FIGS. 1A-1C for example, the camera 112 may be rotated or moved horizontally (i.e., side to side) from the location shown in these figures. As will be described further below, this permits the camera 112 to execute one or more capture sequences where the camera is positioned at various positions to capture one or more images.

The carrier mount 216 may be configured as an enclosure and/or support for the camera 112. As shown for example, the carrier mount 216 encloses the camera 112 while supporting the camera. The carrier mount 216 may be rotatably mounted so as to allow it and the camera 112 to be moved. For example, in one or more embodiments, the carrier mount 216 may pivot on an axel, stem, or the like extending from a mounting surface of the enclosure 116 into the carrier mount, or vice versa.

The carrier mount may 216 may work in cooperation with a motor 212 and drive assembly 208. The drive assembly 208 will typically be configured to transfer power from the motor 212 to the carrier mount 216 so as to move the carrier mount. For example, the drive assembly 208 may comprise one or more gears, drive belts, and the like to transfer power from the motor 212. It is noted that the drive assembly 208 may be optional in some embodiments, since the motor 212 may be directly coupled to the carrier mount 216.

The drive assembly 208 may be configured to provide a mechanical advantage to the motor 212, such as by including one or more gears, pulleys, sprokets, or the like. In this manner, a smaller motor 212 may be used to reduce noise and size requirements. In addition, it is contemplated that the drive assembly 208 may reduce the power requirements for moving the carrier mount 216 and camera 112, thus preserving battery life.

It is noted that the coupling between the motor 212 and carrier mount 216 may also help support the carrier mount. For example, a drive shaft may extend between the motor 212 or the drive assembly 208 and the carrier mount 216. In this manner, the drive shaft (or other coupling element) can at least help rotatably secure the carrier mount 216.

The carrier mount 216, motor 212, and drive assembly 208 may be configured to move silently. In this manner, the motion of the camera is difficult or impossible to detect thereby allowing images of various objects to be captured without their knowledge. This is so even if the object is an animal or person with particularly sensitive hearing.

Figure 3:
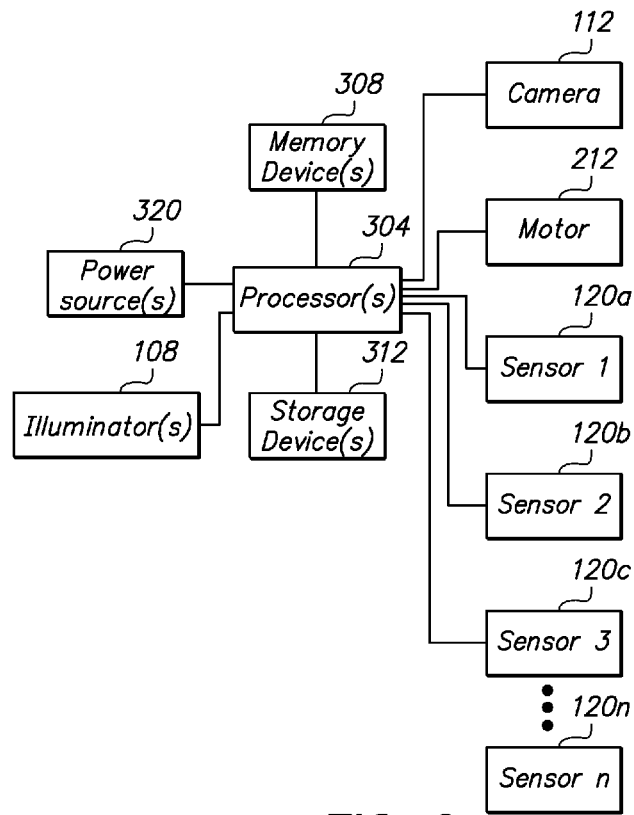
FIG. 3 is a block diagram illustrating exemplary components of a motorized camera.

FIG. 3 is a flow diagram illustrating electronic components of an exemplary motorized camera. As can be seen, such components may include one or more processors 304, memory devices 308 and/or storage devices powered by a power source 320, such as one or more batteries. It is noted that various power sources could be used including solar panels, external generators, or grid power.

In general, a processor 304 will be configured to receive input, process such input, and provide an output which governs the operation of the motorized camera or components thereof to provide the functionality of the motorized camera as disclosed herein. The processor 304 may execute one or more instructions to provide such functionality. In some embodiments, the instructions may be machine readable code stored on a memory device 308 or storage device 312 accessible to the processor 304. Alternatively or in addition, some or all of the instructions could be hardwired into the processor 304 itself. It is noted that the instructions may be upgradable such as by replacing old instructions with new ones.

The memory devices 308 may be temporary storage such as RAM or a cache, while the storage devices 312 may be more permanent storage such as a magnetic, flash, or optical storage device. It is contemplated that the storage device 312 may utilize removable media or may be remote storage accessible by the processor 304 via one or more communication links in one or more embodiments. It is noted that, either one or both the memory device 308 and storage device 312 may be provided in some embodiments.

As can also be seen, the processor 304 may be in communication with various other devices. For example, the processor 304 may communicate sensor information with one or more sensors 120. In general, the sensors 120 are configured to detect objects that come within their range. Sensors 120 of various types may be used. For example, an infrared sensor may be used to detect objects, such as wildlife, people, or other things based on the heat they emit. The infrared sensor may be passive or active in various embodiments. Other sensors 120 include radiofrequency sensors, audio sensors, vibration sensors, motion sensors, and the like. In general, the sensors 120 will be configured to generate sensor information which identifies whether or not a desired object has been detected. It is noted that the sensors 120 may be selected or configured to detect particular objects. For example, passive infrared sensors 120 may be used to detect the presence of wildlife or people, while radiofrequency or other sensors may be used to detect objects, such as vehicles, weapons, or the like. It is contemplated that different types of sensors 120 could be used in a single motorized camera. Alternatively, all the sensors 120 may be of the same type.

The processor 304 may take into account which of the sensors 120 it is receiving sensor information from and perform different operations as a result. For example, as will be described further below, sensor information from a first sensor 120A may result in a first set of operations being executed while sensor information from a second sensor 120B may result in a second set of operations being executing. It can thus be seen that a number of different operations could be performed depending which of a plurality of sensors 120 has sent sensor information indicating to the detection of an object.

In one or more embodiments, the sensor information may be used to generate output to a motor 212 such as to move or position the camera 112 at a particular location. For example, the processor 304 may receive sensor information and then communicate instructions or signals to the motor 212 to position the camera 112 at a particular location or at a sequence of locations. In one embodiment, the motor 212 may be instructed to rotate a number of full or partial revolutions to position the camera 112 to capture image(s) of an object. The processor 304 may also control the camera 112 to capture one or more images while the camera is being moved, before or after the camera has moved, or all three.

It is contemplated that the processor 304 may also activate an illuminator 108 to illuminate the scene to allow the camera 112 to capture a better image, such as by lighting the area. It is noted that the illumination may be visible or invisible light (e.g., infrared illumination). The processor may be in communication with a light sensor or the like to determine whether or not illumination is needed. Alternatively, the processor may consult an internal or other clock and a list of predefined light levels to determine how much sunlight is available.

Figure 4:
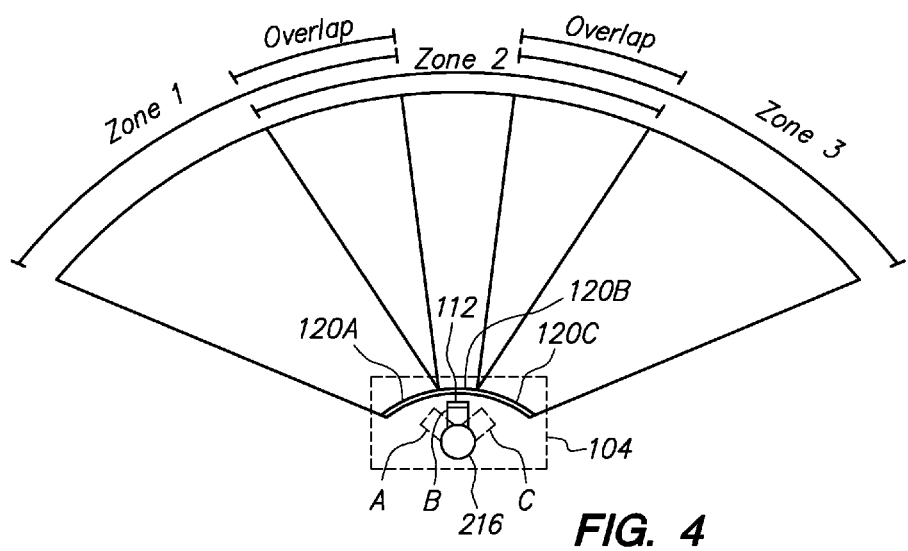
FIG. 4 illustrates an exemplary motorized camera and its detection zones.

Operation of the motorized camera will now be generally described with regard to FIG. 4. FIG. 4 is a top view illustrating exemplary detection zones, Zones 1, 2, and 3, for an embodiment of the motorized camera 104. As can be seen, a zone may correspond to a particular sensor 120. Stated another way, each sensor 120 may have its own detection zone. A detection zone may be the area in which a sensor 120 may be capable of detection objects. It is contemplated that a sensor 120 may to have one or more lenses or other focusing devices to better define its detection zone.

In addition, the position of a sensor 120 may define its detection zone. For example, as shown in FIG. 4, it can be seen that the triangular detection zones, Zones 1, 2, and 3 are positioned based on the orientation of the sensors 120A, 120B,120C at the motorized camera 104. Referring to FIGS. 1A-1C and FIG. 4, it can be seen that the sensors 120 may be positioned in a curved arrangement, such as the convex arrangement shown. This arranges the detection zones of FIG. 4 in the pie shape as shown. It can also be seen that there may be some overlap of the detection zones. For example, Zones 1 and 2 partially overlap and Zones 2 and 3 partially overlap in FIG. 4.

As disclosed earlier, the camera 112 may have a number of predefined camera positions corresponding to the detection zones. This is also illustrated in FIG. 4. For example, Camera Positions A, B, and C may be defined for Zones 1, 2, and 3. Typically, the predefined camera positions will be locations at which the camera 112 is positioned to capture an image of the entire area contained within a zone (minus any areas behind physical obstructions through which the camera cannot see). In other words, the camera's 112 view at a predefined camera position may match that of a sensor's detection zone. In this manner, an object detected within a zone can be captured from that zone's predefined camera position.

The motorized camera 104 may initiate one or more operations based on which zone or zones an object or objects are detected in. If an object is detected in an overlap area shared by two (or more zones), the operations to be performed may be selected based on a priority of zones. For example, if an object is in the overlap area of Zone 1 and Zone 2, operations associated with a priority zone may be performed. A list of zones by priority may be defined for each overlap area in one or more embodiments. Alternatively, it is contemplated that operations associated with all zones including the object may be initiated.

In general, the operations comprise one or more sequences of camera actions (capture sequences) initiated as a result of object detection. Since the motorized camera 104 may determine which one (or more) of its sensors 120 detected an object, different capture sequences may be initiated accordingly. Typically, the capture sequences will be defined by one or more instructions, such as in the form of machine readable code, provided to the motorized camera 104.

As described briefly above, a capture sequence may include one or more movements of the camera, activation of illumination device(s), image capture, or various combinations thereof. In addition a capture sequence may include image processing, as will be described below. Some examples of capture sequences are now provided with regard to FIG. 4.

Example Sequence 1: If an object is detected in a detection zone, the camera may be moved to a preset location targeting that detection zone or an area therein. An image or multiple images may then be captured. Depending on one or more light level thresholds, an illuminator may be activated to provide illumination as the image is captured. It is noted that the level of illumination may be adjusted based on the light level around the camera. The illuminator may be activated for various capture sequences.

Example Sequence 2: If an object is detected in a detection zone, the camera may move from its current location to target the zone in which the object has been detected. One or more images may be captured during this motion. The camera's motion may be stopped or momentarily stopped to capture these images. For example, if the camera currently points at Zone 3 and an object has been detected in Zone 1, the camera may capture one or more images at each zone as it moves from Zone 3 to Zone 1. Once at the target zone, one or more images may be captured as well.

Example Sequence 3: If an object is detected in a detection zone, the camera may initiate a predefined sequence of movements and image captures. For example, if an object is detected at Zone 2, the camera may initiate a sweep sequence from Zone 3 to Zone 1 (or vice versa) capturing one or more images as it moves. It is contemplated that once the images are captured (in this and other examples), they may be processed by the camera. For example, the images captured during the movement from Zone 3 to Zone 1 (or vice versa) may be automatically stitched together to form a panorama, such as by the processor of the motorized camera 104.

Example Sequence 4: If an object is detected in a detection zone, the camera may capture at least one image in that zone and its adjacent zone or zones. For example, if an object is detected in Zone 1, the camera may be moved to Zone 1 (if not already there) to capture one or more images, the camera may then be moved to Zone 2 to capture one or more images. As another example, if an object is detected in Zone 2 the camera may capture one or more images in Zone 2 and them move to Zone 1 and/or Zone 3 to capture one or more images there.

Example Sequence 5: If an object is detected in an overlap area, the camera may capture one or more images in the overlapping zones. In other words, if an object is detected in two or more zones, one or more images may be captured in each zone in which the object is detected. For example, one or more images may be captured with the camera targeting Zone 3 and Zone 2, if an object is detected in the overlap area shared by Zone 3 and Zone 2.

Once one or more images have been captured, they may be saved, such as to a storage device of the motorized camera.

For example, the images may be saved to a flash memory, hard drive, optical disc, or other medium. As stated, image processing may occur after an image has been captured. It is contemplated that an original captured image and its processed counterpart may be stored. In some embodiments, images may be combined, such as to form a panoramic image. The combined image may be stored on a memory device as well.

Figure 5:
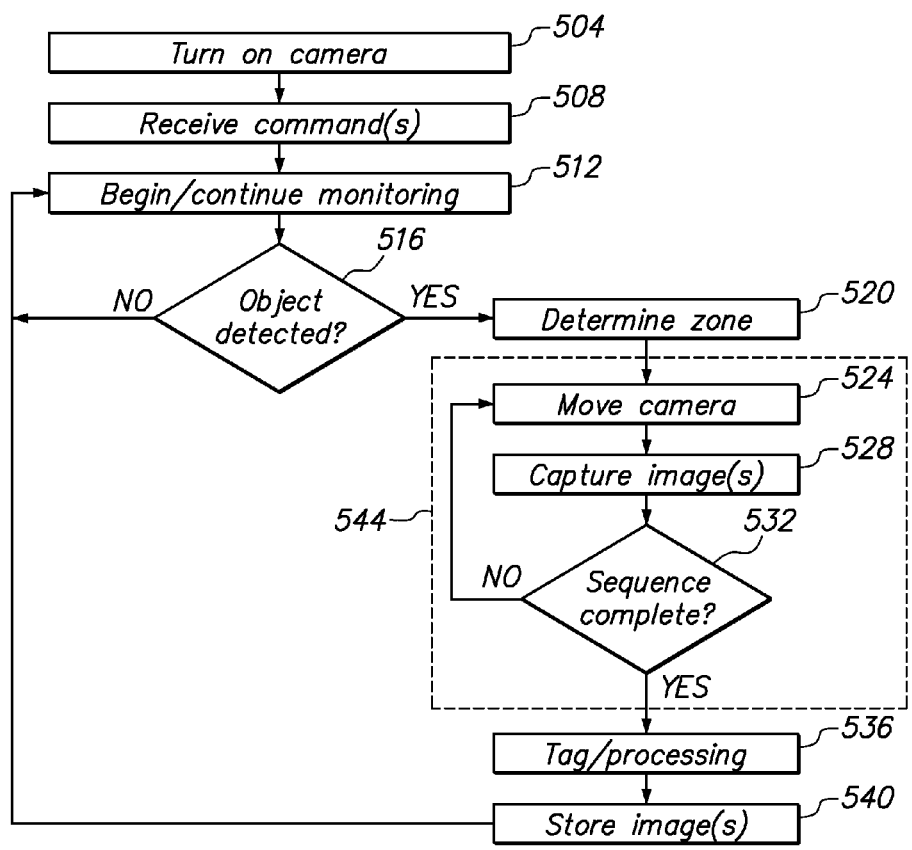
FIG. 5 is a flow diagram illustrating operation of an exemplary motorized camera.

Additional details regarding operation of an exemplary motorized camera will now be described with regard to the flow diagram of FIG. 5. It is noted that though presented in a particular order, one or more of the steps in the following may occur in various orders.

At a step 504, the camera may be turned on or activated. At a step 508, one or more commands may be received, such as via one or more input devices of the motorized camera. It is contemplated that an external device could be used as well or instead. For example, a computer, handheld, or other device could be used to input or upload or otherwise provide commands to the motorized camera via a communication to link or a removable memory device.

The commands may be used to configure the camera. For example, a user may set the time, date, image quality, image size, and other parameters. It is contemplated that various timers may be established as well. For example, one or more timers may be set to automatically turn on or off the motorized camera (or activate/deactivate its monitoring or image capture functions) at various times or dates. This helps preserve or conserve power, and may be used to help ensure that the object a user desires to capture is more likely to be captured. For example, to capture nocturnal wildlife, one or more timers may be set to activate the motorized camera at night. This increases the likelihood that nocturnal wildlife is captured, saving power as well as storage capacity. This in turn extends the operational time of the motorized camera in the field before additional power or storage capacity is needed.

In one or more embodiments, commands (or other input) may be received to program one or more image capture sequences. In general, such commands will define the operation of the camera when an object is detected. For example, as disclosed above, the camera may be moved to a particular index or position to capture one or more images in one or more zones as a result of an object being detected. Thus, the capture sequences may comprise particular camera movements, image capture actions, illuminator actions and other operations that occur when an object is detected by the motorized camera's sensors. As stated above, different sequences may be defined based on the zone or zones in which an object is detected. In addition, the sequences may include conditional instructions or operations. For example, an illuminator action may be defined to activate an illuminator only if a light to level threshold (or other condition) is met.

In general, the camera movements of a capture sequence will comprise instructions to move a camera from one position to another. In some embodiments, the camera may be capable of being positioned in discrete locations along a continuum. For example, as shown in FIG. 1 and FIG. 4, there are three sensors 120, each having their own position and orientation, which define three detection zones, Zones 1-3. Therefore, in this example, the camera 112 may have three discrete positions (e.g., left position, center position, right position) corresponding to each of the zones. The camera movements in this example may be configured to allow the camera to move between these fixed positions. It is noted that fewer or additional sensors, detection zones, and camera positions (other than the three described above) may be provided in various embodiments of the motorized camera.

In general, the image capture actions of a capture sequence instruct the camera to capture one or more images. The image capture actions may define a number of images to capture once the camera is at a particular location. It is contemplated that the image capture actions may include one or more conditional operations that may be executed if particular conditions are met. For example, the camera may be instructed to capture additional images if lighting conditions are dim or otherwise undesirable, such as to increase the likelihood that a quality image of an object is captured in such conditions.

In some embodiments, the image capture actions may define settings for the camera. For example, exposure, zoom, and focus could be defined. Alternatively, one or more of these could be automatically set by the motorized camera. Since it may be difficult to properly set these actions, it is noted that some embodiments of the motorized camera may utilize a fixed aspect camera which may automatically capture quality images without requiring a defined exposure, zoom, and/or focus setting.

It is noted that the commands received at step 508 may be received at various times. In some embodiments, such as described above, the commands may be received via a removable memory device inserted into the motorized camera. Thus the motorized camera need not even be turned on to receive the commands. Likewise, one or more commands may be received while the motorized camera is activated. For example, one or more capture sequences may be updated, deleted, or added in this manner.

At a step 512, the motorized camera may begin monitoring for objects in its detection zones. This may include activating one or more of the motorized camera's sensors. At a decision step 516, if an object is detected one or more capture sequences 544 may occur, such as shown. If no object is detected, the motorized camera may continue monitoring at step 512.

If an object is detected, the zone or zones in which the object was detected may be determined in a step 520. This may occur in various ways. In one embodiment, the sensor which detected the object may indicate which of the zones the object is in. To illustrate, referring to FIG. 4, it can be seen that each detection zone corresponds to a sensor. Thus, the sensor that detects an object identifies which zone the object is in. It is noted that two or more sensors may detect the object, such as if the object is in an overlap area. In such case, the sensors that detected the object may to be used to identify which zones the object is in. If multiple objects are detected, each object, the zone or more zones in which they were detected may be determined as well.

The camera and sensors may be calibrated to have corresponding capabilities. For example, the detection zone of a sensor may be calibrated to match the view captured by the camera, or vice versa. In this manner, moving the camera to a particular zone ensures that everything in the detection zone is captured by the camera. This is advantageous in that it ensures that an object detected in a zone is captured even if the object is at the edges or fringes of the zone.

One or more capture sequences 544 may then be executed. Though shown as including particular steps by the dashed box in FIG. 5, it is contemplated that a capture sequence may include various steps or operations, such as described herein. For example, a capture sequence may include tagging an image, which will be described further below. It is noted that one or more capture sequences may be retrieved from a storage device of the motorized camera for execution based on various criteria. For example, different capture sequences may be retrieved for execution depending on which zone or zones an object was detected in. Some other exemplary criteria include the time of day, ambient light level, visibility, wind, humidity, and other environmental conditions. It is noted that these criteria may also or alternatively be used in the capture sequences (such as in one or more conditional instructions) such as to define image capture, camera movement, and illuminator actions.

At a step 524, the camera may be moved to a particular position according to to the capture sequence. For example, if the capture sequence instructs the camera to move to the zone in which the object was detected, the camera will so move in step 524. It is noted that typically the camera will at some point be moved to the zone in which the object was detected to capture one or more images there. It is also noted that that zone need not be the zone the first image or images are capture in. For example, an image may be captured at the camera's current position and then at the zone in which the object was detected (after the camera has been moved there).

At a step 528, one or more images may be captured. Again, the capture sequence may define the number of images captured and zoom, focus, or other camera settings. The capture sequence may also define a variable number of images to be captured based on the favorability or unfavorability of visibility, light, or other conditions, such as described above.

At a decision step 532, it may be determined whether or not a capture sequence is complete. As stated above, a capture sequence may include one or more camera movements to capture images at various camera positions. Thus, at decision step 532, if the capture sequence is not complete, the camera may be moved to another position at step 524 where one or more additional images may be captured at step 528. Camera movement and image capture (as well as other capture sequence) steps may be repeated until the capture sequence is complete at decision step 532.

If at decision step 532 the capture sequence is complete, the captured image(s) may be processed and/or tagged at a step 536. For example, captured images from a capture sequence may be processed to improve or alter their color, exposure, or other attributes. As another example, if the capture sequence was a panoramic sequence, to the images captured may be stitched together as part of the processing of step 536.

Images may also be tagged at step 536. In general, tagging identifies one or more particular images from the other images that have been captured. In one or more embodiments, the particular images may be those that are more likely or that actually contain the object that was detected. For example, in a capture sequence spanning multiple zones, only image(s) capture in the zone at which the object was detected may be tagged. This allows these images (which contain the object) to be easily selected and viewed out of the remainder of the images that have been captured. This is highly advantageous especially where there are numerous images to review. It is noted that tagging and/or processing of images may occur as part of a capture sequence. For example, images may be processed and/or tagged after they have been captured.

Tagging may occur in various ways. In one embodiment for example, the image files may have a "tag" written or associated therewith. In another embodiment, tagged images may be stored in a different directory, folder, storage device, or data storage area than untagged images. In yet another embodiment, a list or database may be maintained by the camera which identifies tagged images, such as by their filename or other identifier.

At a step 540, captured images may be stored on a storage device. Typically this will be a storage device internal to the motorized camera so that the motorized camera does not rely on an external device to operate. It is contemplated that a remote storage device could be used in some embodiments however. The step of storing an image may also occur as part of a capture sequence. For example, a copy of a captured image may be stored right after it has been captured. Additional copies of the image may then be stored as well, such as a copy of a processed version of the image or a stitched together panorama of a number of captured images. Tagging may occur before or after the image has been stored.

Once a number of images have been stored, a user may view them. In one or more embodiments, the motorized camera may provide a view screen, such as an LCD or other display, through which the captured images may be displayed. In addition or alternatively, the motorized camera may have a communication device that may be used to transmit images to other devices for viewing. Alternatively or in addition, a removable storage device on which the images have been stored can be removed from the motorized camera and inserted into another device for viewing or other operations. For example, the storage device may be a flash memory stick, USB memory, hard drive, optical media, or other storage medium that is readable via another device, such as a computer, printer, or the like.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A motorized wildlife camera for capturing one or more images of an animal according to one or more capture sequences comprising:
   a mount configured to securely mount the motorized wildlife camera at an outdoor location;
   a plurality of separate sensors, each of the plurality of sensors associated with a distinct one of a plurality of detection zones and configured to generate an output identifying its associated detection zone only when an animal is detected within its associated detection zone;
   a rotating camera configured to rotate to point to each of the plurality of detection zones and capture one or more images thereof;
   a motor configured to move the rotating camera to point to each of the plurality of detection zones;
   a storage device configured to store the one or more images;
   one or more processors configured to receive the output and to execute one or more capture sequences when the output is received, the one or more capture sequences comprising:
      rotating the rotating camera to the detection zone identified in the output with the motor;
      capturing an image of the animal with the rotating camera while the rotating camera is at the detection zone identified in the output;
      after capturing the image of the animal, rotating the camera to one or more other detection zones not identified in the output with the motor according to a predefined order;
      capturing a plurality of additional images by capturing an additional image while the camera is at each of the one or more other detection zones;
      positioning the image of the animal and plurality of additional images adjacent to one another in a single combined image according to the predefined order; and
      storing the single combined image on the storage device.

2. The motorized wildlife camera of claim 1 further comprising an internal power source and an enclosure, wherein the enclosure forms a watertight outer shell for outdoor use of the motorized wildlife camera and the power source provides electrical power for the motorized wildlife camera.

3. The motorized wildlife camera of claim 1 further comprising a plurality of illuminators, each of the plurality of illuminators positioned to illuminate only one of the plurality of detection zones.

4. The motorized wildlife camera of claim 3, wherein the processor is further configured to activate one of the plurality of illuminators corresponding to the one of the plurality of detection zones where the animal was detected when the image of the animal is captured.

5. The motorized wildlife camera of claim 1, wherein the plurality of sensors are positioned relative to one another to form a convex arrangement of sensors.

6. The motorized wildlife camera of claim 1, wherein the one or more capture sequences further comprise writing a tag to the image of animal without writing the tag to the plurality of additional images to make the image of the animal readily identifiable from the plurality of additional images.

7. A motorized wildlife camera comprising:
- a mount configured to securely mount the motorized wildlife camera at an outdoor location;
- a plurality of sensors configured generate sensor information identifying one of a plurality of detection zones in which an animal has been detected;
- a camera movable between a plurality of predefined positions to point at each of the plurality of detection zones;
- a motor configured to move the camera to point at each of the plurality of detection zones;
- one or more capture sequences comprising instructions to:
  - move the camera to point at the detection zone identified in the sensor information with the motor;
  - capture an image of the animal with the camera pointed at the detection zone identified in the sensor information;
  - after capturing the image of the animal, move the camera to point at one or more other detection zones not identified in the sensor information with the motor according to a predefined order;
  - capture a plurality of additional images by capturing an additional image while the camera is pointed at each of the one or more other detection zones; and
  - store the image of the animal and plurality of additional images on a storage device; and
- one or more processors configured to receive the sensor information, and upon receipt of the sensor information execute.

8. The motorized wildlife camera of claim 7, wherein the one or more processors are configured to position the image of the animal and the plurality of additional images adjacent to one another in a single combined image according to the predefined order.

9. The motorized wildlife camera of claim 7, wherein the one or more processors are configured to distinguish the image of the animal from the plurality of additional images by an action selected from the group consisting of: storing the image of the animal but not the plurality of additional images in a particular directory, and writing a particular identifier to the image of the animal but not to the plurality of additional images.

10. The motorized wildlife camera of claim 7, wherein the predefined order is user defined via an input device.

11. The motorized wildlife camera of claim 7 further comprising a plurality of illuminators each configured to illuminate only one of the plurality of detection zones, wherein the one or more capture sequences further comprise instructions to selectively activate one of the plurality of illuminators to illuminate the detection zone identified in the sensor information when the image of the animal is captured.

12. The motorized wildlife camera of claim 7 further comprising one or more batteries and an enclosure, wherein the batteries power the motorized wildlife camera and the enclosure forms a watertight outer shell for outdoor use of the motorized wildlife camera.

13. A method of capturing one or more images with a motorized wildlife camera comprising:
- positioning a motorized wildlife camera comprising a plurality of sensors and a rotatable camera at an outdoor vantage point such that a plurality of detection zones provided by the plurality of sensors cover an area of interest at the outdoor vantage point,
- wherein the rotatable camera is configured to capture a plurality of images according to one or more capture sequences,
- wherein the plurality of images comprise an image of an animal at the one of the plurality of detection zones where the animal was detected, and a plurality of additional images of a plurality of second detection zones adjacent the one of the plurality of detection zones where the animal was detected;
- detecting the animal in one of the plurality of detection zones with the plurality of sensors and outputting sensor information from the plurality of sensors that identifies the detection zone where the animal was detected;
- activating one or more capture sequences of the motorized wildlife camera based on the sensor information, wherein each of the one or more capture sequences comprise instructions to move the camera to the detection zone identified in the sensor information to capture the image of the animal, and then to each of the plurality of second detection zones according to a predefined order to capture the plurality of additional images; and
- positioning the plurality of images adjacent to one another in a single combined image according to the predefined order, wherein the plurality of additional images are positioned to the left and right of the image of the animal.

14. The method of claim 13 further comprising receiving the one or more capture sequences from a user with one or more input devices of the motorized wildlife camera.

15. The method of claim 13, wherein the predefined order is received from a user via one or more input devices of the motorized wildlife camera.

16. The method of claim 13 further comprising activating one or more conditional actions of the one or more capture sequences, the one or more conditional actions comprising instructions to activate one of a plurality of illuminators of the motorized wildlife camera to illuminate only the detection zone identified in the sensor information when the image of the animal is captured.

17. The method of claim 13 further comprising attaching the motorized wildlife camera to a structure at the outdoor vantage point with a mount to secure the motorized wildlife camera in position.

* * * * *

UNITED STATES PATENT AND TRADEMARK OFFICE
CERTIFICATE OF CORRECTION

PATENT NO. : 8,773,501 B2  Page 1 of 1
APPLICATION NO. : 13/164358
DATED : July 8, 2014
INVENTOR(S) : Howard Unger It is certified that error appears in the above-identified patent and that said Letters Patent is hereby corrected as shown below:

In the Claims

Column 15, Line 26, Claim 7, replace "configured" with --that--.
Column 15, Line 50, Claim 7, after "execute" insert --the one or more capture sequences--.

Signed and Sealed this
Fourteenth Day of April, 2015

Michelle K. Lee
*Director of the United States Patent and Trademark Office*